April 22, 1930.  A. L. KNAPP  1,755,959
MOTOR VEHICLE
Filed Oct. 12, 1925
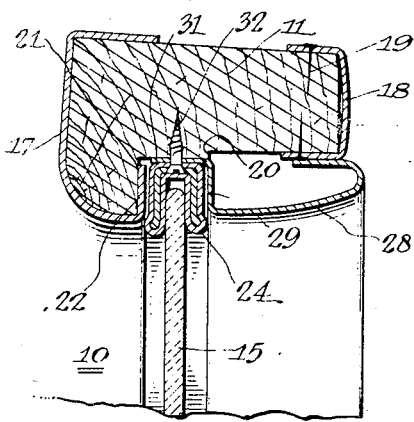
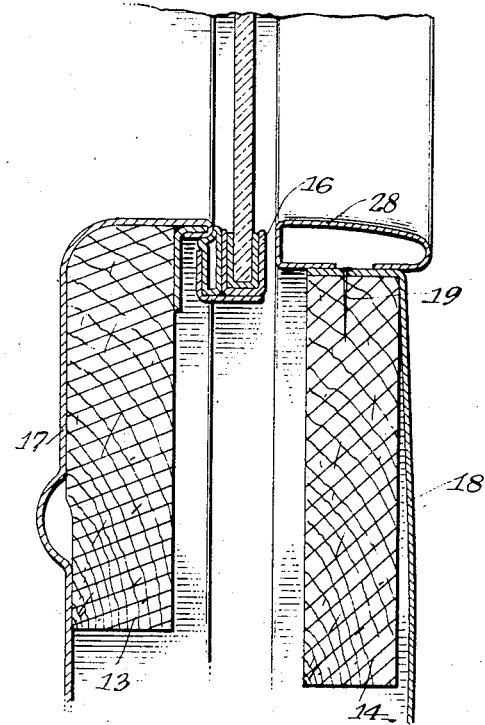
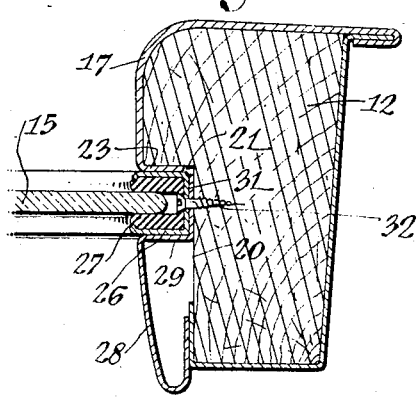
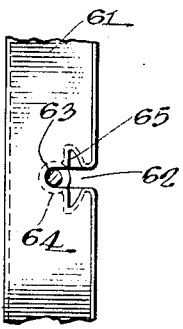
Fig. 5
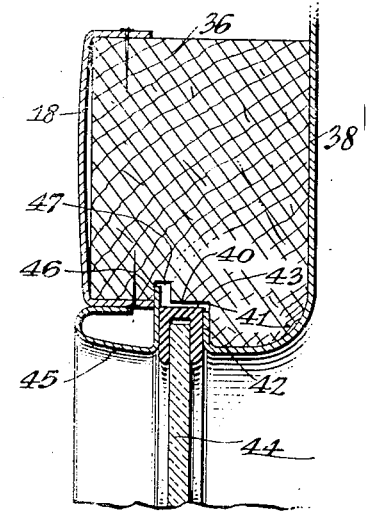
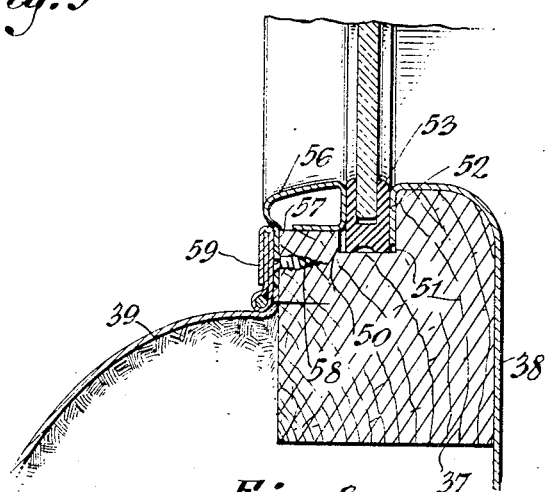
Fig. 3
Fig. 1
Fig. 2
Fig. 4
Inventor
Archer L. Knapp
By Miller Schott
Attorney Patented Apr. 22, 1930

1,755,959

UNITED STATES PATENT OFFICE

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed October 12, 1925. Serial No. 61,884.

This invention relates to motor vehicles and particularly to the window structure thereof. It has for one of its objects to provide the windows of such vehicles with retaining and trim moulding which shall be easily applied and which shall be firmly secured in place by concealed means.

Another object of the invention is to provide such a moulding which may be readily removed at any time with ordinary hand tools, without danger of damage to the upholstery of the vehicle and without scratching or marring any of the finished parts.

Other objects of the invention will appear from the following description taken in connection with the drawing, which forms a part of this specification and in which:

Fig. 1 is a vertical cross section through a portion of the side wall of a motor vehicle body, showing the application of the invention to a window of the vertically adjustable type;

Fig. 2 is a horizontal section through the window shown in Fig. 1, and through one of the supporting side members thereof;

Fig. 3 is a sectional view, similar to Fig. 1, showing the application of the invention to that type of window which is rigidly mounted in its frame;

Fig. 4 is a sectional view through the header or top frame member of a window similar to that shown in Fig. 3, showing a modified form of construction, and Fig. 5 is a detail section taken substantially on the line 5—5 of Fig. 4.

It has become quite usual, in the construction of motor vehicle bodies, to surround the window openings, interiorly of the body, with trim moulding which is usually formed of pressed sheet metal. Such moulding not only serves to cover the exposed edges of the upholstery, and thus give a neat and finished appearance to the body interior, but it is not infrequently used to position and retain the channel members in which the window glass is usually framed or mounted. Such moulding is commonly held in place by small screws which pass through it into the frame members of the body surrounding the windows. In vehicles of the better class, these screws are quite objectionable as attaching means for the mouldings; not only because their exposed heads give an unfinished appearance to the body interior, but also because if small enough to be neat and unobtrusive they lack the mechanical strength desired for securing the moulding and the associated parts. It is also frequently difficult to remove such screws, because of their small size, without damaging the upholstery or scratching the moulding or other finished parts of the body. The present invention contemplates a structure in which such difficulties shall be avoided and the means whereby the moulding is secured shall be concealed from sight but readily accessible for removal.

Referring to the drawings, at 10 is shown a window opening of a motor vehicle, which may be the window in one of the vehicle doors, or in the side of the vehicle body, and which opening is defined by a header or top member 11, side frame members 12, and a pair of bottom frame members 13 and 14. The opening 10 is adapted to be closed by a pane or light of window glass 15, which is mounted at its bottom edge in the usual metal binding or channel 16, and which is vertically adjustable in the well known manner (not shown).

The frame member 13 is adapted to support the usual metal body panel 17, and the outer face of the header 11 is preferably sheathed in similar metal, while the inner face of this header and the inner face of the frame member 14 are adapted to be covered with the leather or fabric 18 with which the body is upholstered, and which is secured thereto by tacks 19 in the ordinary way. The lower face of the header 11, and the side faces of the frame member 12 are each provided with a longitudinally disposed recess 20, one face of which forms a shoulder 21, and the metal body panel 17 is provided at the top of the window opening with an upturned flange 22 and at its sides with inturned flanges 23 adapted to lie against these shoulders 21.

In the recess 20 in the header 11 is placed a channel member 24, preferably formed of pressed metal in the usual manner, and this channel member is adapted to receive the upper edge of the glass 15 when the latter is adjusted into its uppermost position. The recesses in the side frame member 12 are provided with somewhat similar channel members 26, which are preferably lined with felt or other suitable shock absorbing material 27, and in which the side edges of the glass 15 are adapted to slide; and channels 24 and 26 being arranged in a common plane.

Interiorly of the body, the window opening 10 is provided with trim moulding 28, preferably formed of pressed metal, which is adapted to cover the edges of the upholstery 18 and the heads of the tacks 19 by which it is secured. The moulding 28 is provided with an inturned portion forming a shoulder 29, which is adapted to bear against and position the channel members 24 and 26, and this shoulder portion has a projecting flange 31 which is adapted to lie against the face of the recess 20 in the header 11, and against the faces of the recesses 20 in the side frame members 12. The channel member 24 is arranged against the face of the flange 31, and the channel members 26 are similarly arranged against the corresponding flanges 31 in the side frame members, these parts being rigidly secured together by wood screws 32, which pass through the bottom of the channel members and through the flanges 31 into the frame members 11 and 12 respectively.

It will be evident that the screws 32 may be easily placed in position at a time when the glass 15 is in its lowermost position and that once in position these screws are not only completely concealed from view from the interior of the body, but that they are of ample strength to rigidly secure both the moulding 28 and the channel members 24 and 26 to the body frame of the vehicle. It is also evident that by lowering the glass they may be easily removed without danger of damage to any of the parts.

In Fig. 3 is illustrated an application of the present invention to a window of the non-slidable type, such as the rear window of a closed vehicle body. In this embodiment the frame of the window is formed of an upper member 36, a lower member 37, and suitable side members which are not illustrated in the drawings. The metal body panels 38 are secured to the outer faces of these frame members in the well known manner and the inner face of the upper frame member 36 is covered with the upholstery 18 while the back of a seat cushion 39 is shown as attached to the lower frame member 37 as by the usual tacks.

The upper frame member 36 is provided with a recess 40, similar to the recess 20 shown in Fig. 1, which recess defines a shoulder 41 against which the inwardly disposed flange 42 of the body panel 38 is secured. This recess 40 also provides space for an upper frame channel 43 for the rear window 44, which channel is clamped against the flange 42 by a moulding 45. The moulding 45 is adapted to cover the exposed edge of the upholstery 18 and its rearwardly disposed face is provided with an upwardly projecting portion 46 which is adapted to project into and be retained in a longitudinal groove 47 in the upper frame member 36.

The lower frame member 37 is provided with a similar recess 50 having a shoulder 51 against which the flange 52 of the lower body panel 38 is secured, and against this flange is mounted a channel member 53 adapted to embrace the lower edge of the window glass 44. The channel member 53 is secured in place against the flange 52 by means of the lower moulding 56, one face of which bears thereagainst and which has a downwardly disposed flange 57 arranged to lie against the forward face of the lower frame member 37. It may be secured thereto in any suitable manner as by a wood screw 58. The heads of the screws 58 and the tacks by which the upholstery 39 is secured to the frame member 37, may be concealed in any suitable manner, as by means of a piece of lace, binding, or other suitable trim material 59.

In the embodiment of the invention above described, the moulding sections 45 and 56, and the side moulding sections which are not illustrated, form an integral frame which is attached, after the window 44 has been placed in position, by inserting the upwardly disposed portion 46 of the moulding 45 in the groove 47, and then pushing the lower portion 56 against the lower window channel 53, after which the screws 58 are inserted. The trim strip 59 is subsequently applied to hide the heads of these screws.

In Figs. 4 and 5 is illustrated a modification of the structure disclosed in Fig. 3, in which the upper moulding section 45' has a vertically disposed flange 60 adapted to bear against the upper window channel 43 and which has a horizontal portion 61 formed with slots 62 as clearly shown in Fig. 5. These slots are adapted to be passed over the shanks of screws 63, secured in the upper frame member 36, the heads 64 of these screws being adapted to catch behind small humps or ridges 65 which are formed in the moulding portion 61 transversely of the slots 62.

The application of the moulding shown in this embodiment will be readily understood, the upper moulding 45 being secured against the upper window channel 43 by passing the slots 62 over the screws 63 until the heads thereof are engaged, and the lower moulding portion being secured in the manner illustrated in Fig. 3.

It will be understood that various forms of the invention other than those described above may be used without departing from the spirit or scope of the invention.

Having thus described the invention, what is claimed and desired to be secured by Letters Patent is:

1. The combination in a motor vehicle body of a frame defining a window opening, channel members on said frame in the plane of the opening, a window glass mounted in said channel members, moulding adapted to position said channel members on said frame, a flange on said moulding engaging a slot in the frame for securing the moulding in position on said frame.

2. A frame having rabbeted slotted members, channel members mounted in the rabbets, a moulding having a flange normal to its bearing face abutting the channel members and engaging the slots in the rabbets.

3. A frame having rabbeted slotted members, yieldable channel members mounted in the rabbets, a moulding having a flange at right angles to its bearing face and in the plane of one side of the moulding, said moulding pressing against the channel members with its flange engaging the slots whereby the resiliency of the channel members retains the flange in the slot.

4. The combination in a motor vehicle body of a rabbeted frame having slots therein, channel members supported in the rabbeted members in a common plane, a window glass mounted in the channel members, molding having a flange at an angle to its bearing face and in the plane of one of the side edges of the moulding adapted to retain the channel members in position, the flange on the molding projecting into the slot for positioning and securing the molding to the frame members.

5. The combination in a motor vehicle body of frame members rabbeted and slotted, channel members supported in the rabbets in a common plane, a window glass mounted in the channel members, molding having a flange at an angle to its bearing face and in the plane with one edge of the moulding, the flange engaging the slot in the rabbet whereby the molding is secured in place and retains the channel members in position.

6. The combination in a motor vehicle body, of a frame comprising a header and side members rabbeted in a common plane to receive channel members, a moulding mounted in the rabbet having a flange extending into a slot in the rabbet to retain the channel members in position, and a window glass mounted in the channel members.

In testimony whereof I affix my signature.

ARCHER L. KNAPP.